United States Patent
Yamamoto

(10) Patent No.: US 7,693,352 B2
(45) Date of Patent: Apr. 6, 2010

(54) SECTIONAL IMAGE SCALING CIRCUIT WITH QUADRATIC FUNCTION SCALING FACTOR

(75) Inventor: Toyoaki Yamamoto, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 833 days.

(21) Appl. No.: 11/585,913

(22) Filed: Oct. 25, 2006

(65) Prior Publication Data
US 2007/0098302 A1 May 3, 2007

(30) Foreign Application Priority Data
Oct. 27, 2005 (JP) ............... 2005-313026

(51) Int. Cl.
*G06K 9/32* (2006.01)
(52) U.S. Cl. .................. 382/300; 345/668; 345/671
(58) Field of Classification Search ............ 382/300; 345/660–671
See application file for complete search history.

(56) References Cited

U.S. PATENT DOCUMENTS

| 6,192,393 | B1 * | 2/2001 | Tarantino et al. ............ 709/203 |
| 6,956,625 | B2 * | 10/2005 | Kim ............................ 348/806 |
| 2002/0186898 | A1 * | 12/2002 | Nagashima et al. ......... 382/300 |
| 2005/0180656 | A1 * | 8/2005 | Liu et al. .................... 382/284 |
| 2005/0206659 | A1 * | 9/2005 | Cutler ........................ 345/660 |
| 2005/0248590 | A1 * | 11/2005 | Tian et al. .................. 345/660 |

FOREIGN PATENT DOCUMENTS

| JP | 11-073154 | | 3/1999 |
| JP | 11073154 A | * | 3/1999 |

OTHER PUBLICATIONS

Richard Szeliski et al, Creating full view panoramic image mosaics and environment maps, SIGGRAPH 1997.*

* cited by examiner

*Primary Examiner*—Anand Bhatnagar
*Assistant Examiner*—Mark Roz
(74) *Attorney, Agent, or Firm*—Studebaker & Brackett PC; Donald R. Studebaker

(57) ABSTRACT

Disclosed is an image converter circuit which is capable of being to be applied to a display device having an arbitrary number of pixels, and is capable of reducing image deterioration in panoramic display. The image converter circuit comprises: a read-control section that reads image data from an image memory in accordance with read-designating information; a data interpolating section that interpolates pixels using the image data read out from the image memory, depending upon magnification-designating information, and outputs enlarged and interpolated data; and a magnification setting section that generates the read-designating information and the corresponding magnification-designating information. The magnification setting section vertically divides the image data into a plurality of areas such that a difference in a number of pixels between the areas is within a predetermined range.

3 Claims, 3 Drawing Sheets

EXAMPLE OF MAGNIFICATION PHM FOR PANORAMIC DISPLAY

SECTIONAL IMAGE SCALING CIRCUIT WITH QUADRATIC FUNCTION SCALING FACTOR

BACKGROUND OF THE INVENTION

1. Field of the Invention

The present invention relates to an image converter circuit for converting the horizontal/vertical number of pixels of an input image into the number of pixels of a display device, and more particularly to an image converter circuit for panoramically displaying, without image deterioration, the input-image data having a small aspect ratio (e.g., 4:3) on a display device having a larger aspect ratio (e.g., 16:9).

2. Description of the Related Art

FIG. 1 is a configuration diagram of a conventional image converter circuit. The conventional image converter circuit has a data input section 1 to which is provided input-image data IN having an aspect ratio of 4:3, e.g., 720 horizontal pixels×540 vertical pixels, and has an image memory 2 connected to the data input section 1. The image memory 2 is constituted by 540 line memories for storing 720 pixels of image data of each of 540 horizontal lines. The input-image data IN inputted through the data input section 1 is sequentially written into the image memory 2.

The image memory 2 is connected to a read control section 3. The read control section 3 reads the designated image data from the image memory 2 in accordance with read-designating information READ designating the position of a pixel to be converted, and provides it to a data interpolating section 4. The data interpolating section 4 enlarges the image data provided from the read control section 3 by interpolating pixels depending upon magnification-designating information MULT, and outputs the enlarged image data OUT.

The image converter circuit has a conversion-control section 5 that sequentially generates, in predetermined timing, signals representing read-designating information READ and magnification-designating information MULT in synchronization with a clock signal CLK, and provides those signals to the read-control section 3 and the data interpolating section 4. The conversion-control section 5 is connected to both a fixed-magnification setting section 7 and a panoramic-magnification setting section 8, through a selector 6 that switches a display mode in response to a mode signal MOD.

The fixed-magnification setting section 7 designates a magnification (horizontally 4/3 times) at which the input-image data IN having 720 horizontal pixels×540 vertical pixels is uniformly enlarged for display on a display device having an aspect ratio of 16:9, e.g., 960 horizontal pixels×540 vertical pixels.

On the other hand, in order to generate a panoramic image, the panoramic-magnification setting section 8 vertically divides the screen into a certain number of blocks and takes a low magnification (e.g. 1 times) for the central block, a high magnification (e.g. 2 times) for the outer blocks, and an intermediate magnification changing in incremental steps for the intermediate blocks.

The fixed-magnification setting section 7 and the panoramic-magnification setting section 8 are configured by a ROM (read-only memory) stored with magnifications that is in advance calculated on a block-by-block basis in accordance with both the number of pixels of the input-image data IN provided from an applicable device and the number of pixels of a display device.

Explanation will now be made on the operation of the conventional image converter circuit.

For example, when digitized input-image data IN is provided from a video decoder of a not-shown television receiver, the input-image data IN is sequentially written on a line-by-line basis into the image memory 2 by a data-input section 1.

In this case, when a fixed-magnification display mode is set, the selector 6 selects the fixed-magnification setting section 7 so that the fixed-magnification information representing about 4/3 times stored in the ROM of the fixed-magnification setting section 7 is provided to the conversion-control section 5. Thus, the fixed-magnification information representing about 4/3 times is provided from the conversion-control section 5 to the data interpolating section 4. Then, the conversion-control section 5 outputs read-designating information READ to the read-control section 3 thereby to read the beginning four pixels from the image memory 2. This causes the read-control section 3 to read the beginning four pixels from the image memory 2 and provides those to the data interpolating section 4.

In the data interpolating section 4, three segments defined by the four pixels are re-defined into four segments, to calculate values (i.e., intensity levels) on the three pixels at boundaries of between the segments through linear interpolation depending upon the four-pixel values provided from the read-control section 3. The data interpolating section 4 outputs, as enlarged-image data OUT, a value of the beginning pixel, a value of the intermediate three pixels calculated and a value of the last pixel. Such operations are performed for all the pixels of each line, thereby obtaining enlarged-image data OUT to uniformly and horizontally perform an enlargement at 4/3 times.

On the other hand, when a panoramic-display mode is set, the selector 6 selects the panoramic-magnification setting section 8 to provide, to the conversion-control section 5, the panoramic-magnification information stored in the ROM of the panoramic-magnification setting section 8.

A panoramic magnification as an enlargement ratio is set for each of the blocks obtained by vertically dividing the screen. Thus, the selector 6 switches information in order between the read-designating information READ provided from the conversion-control section 5 to the read-control section 3, and the magnification-designating information MULT provided to the data interpolating section 4, on every block for read and conversion.

For example, for converting the blocks on the left and right ends of the screen, magnification-designating information MULT is given as two times while read-designating information READ is as the horizontal number of pixels of the block at the end. Meanwhile, for converting the block at the center block of the screen, magnification-designating information MULT is given as one times while read-designating information READ is as the number of pixels of the central block.

In the data interpolating section 4, linear interpolation is performed to make the pixels provided from the read-control section 3 into the number corresponding to the magnification given by the magnification-designating information MULT. Those are enlarged to the magnification designated for each of the blocks, thus being outputted as enlarged-image data OUT. This provides enlarged-image data OUT that enlargement is horizontally done to the panoramic magnification.

Incidentally, in the present example, because the vertical number of pixels on the screen is equal between input and output, enlargement-interpolation is not done vertically. Where the vertical number of pixels is different between input and output, enlargement-interpolation is performed at a fixed magnification.

Japanese Patent Application Publication (Kokai) No. Hei11-73154 discloses a conventional image conversion device that is capable of converting the number of horizontal pixels or vertical pixels, which is incorporated herein by reference.

However, the conventional image converter circuit involves the following problem.

Namely, the fixed-magnification setting section 7 and the panoramic-magnification setting section 8 are configured by a ROM storing a value that is in advance calculated as matched to the number of pixels of input-image data IN from an applied device and to the number of pixels of the display device. For this reason, when the conventional image converter circuit is applied to a display device having the different number of output pixels for display, there encounters a case that input-image data IN cannot be displayed at its end portion or a case that there is a surplus at the end portion of the display screen. Therefore, the enlarged image cannot be appropriately displayed.

Furthermore, in the panoramic display, because of incapability of providing the large number of the blocks into which the screen can be divided, there encounters a great change of the magnification between the blocks. With displaying such a moving image that moves horizontally, there is a problem in that the moving looks unnatural and unsuitable at the boundary between the blocks.

SUMMARY OF THE INVENTION

In view of the foregoing, it is an object of the present invention to provide an image converter circuit that is capable of being applied to a display device having an arbitrary number of pixels, and that is capable of reducing image deterioration in panoramic display.

According to an aspect of the present invention, there is provided an image converter circuit. The image converter circuit comprises an image memory for storing an input image; a read control section for reading image data from the image memory in accordance with read-designating information designating an area to be converted; a data interpolating section for interpolating pixels depending upon magnification-designating information to enlarge an image read out by the read-control section, and outputting the enlarged image; and a magnification setting section for setting the read-designating information and the corresponding magnification-designating information in accordance with both a number of pixels of the input image and a number of pixels of the enlarged image. In the image converter circuit, the magnification setting section is configured as described below.

Namely, the magnification setting section includes: an image divider for vertically dividing the enlarged image into a plurality of areas such that a difference in a number of pixels between the areas is within a predetermined range; and a magnification calculating section for calculating horizontal magnifications for the respective areas to provide the read-designating information and its corresponding magnification-designating information. Each of the horizontal magnifications has a value that, in accordance with a monotonic increasing function, increases with increasing distance from a center area of the plurality of areas.

It is preferable that the image divider sets, to $2^n$, the number of areas obtained by dividing an enlarged image to assign the areas with the quotient resulting from the division of the number of horizontal pixels by $2^n$, and that the areas are additionally assigned with the remainder such that the areas are assigned with 1 one by one from the outside.

According to the present invention, the image divider vertically divides the enlarged image into a plurality of areas so as to regulate the numbers of pixels of the respective areas to be nearly the same value. Then, the enlargement magnifications corresponding to the respective areas are set to be values that, in accordance with a monotonic increasing function (e.g., a quadratic function), increases with increasing distance from a center area of the areas and has a minimal value at the center area. This makes it possible to calculate magnification-designating information that causes the size of an input image to be converted into the size of the enlarged image, regardless of the size of the enlarged image. Further, the magnification-designating information allows for smooth change depending on the distance from the center area. Therefore, there can be an effect of reducing image deterioration in panoramic display.

Further features of the invention, its nature and various advantages will be more apparent from the accompanying drawings and the following detailed description of the preferred embodiments.

DETAILED DESCRIPTION OF THE INVENTION

This application is based on Japanese Patent Application No. 2005-313026 which is incorporated herein by reference.

Figure 1:
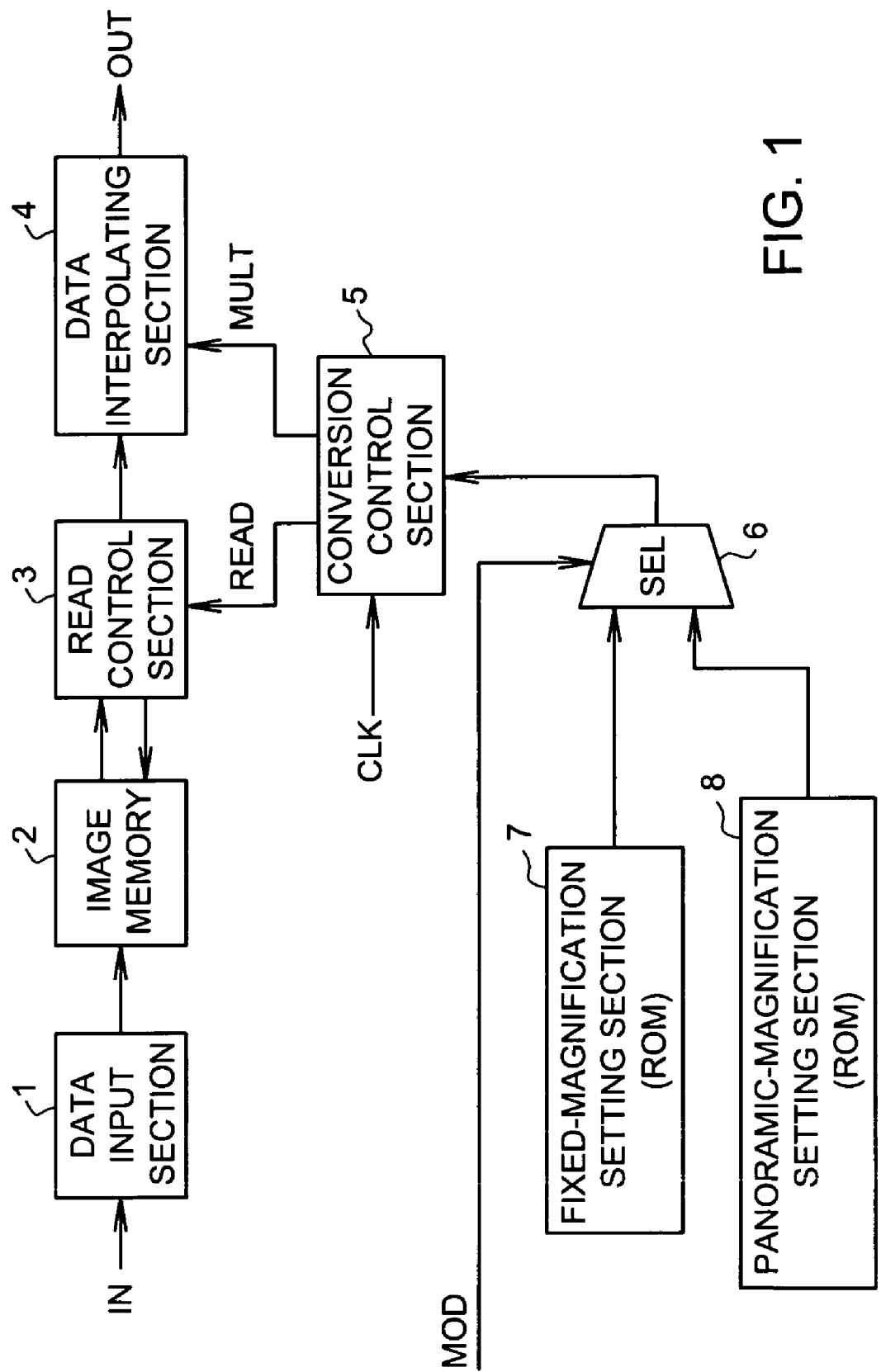
FIG. 1 is a configuration diagram of a conventional image converter circuit.
Figure 2:
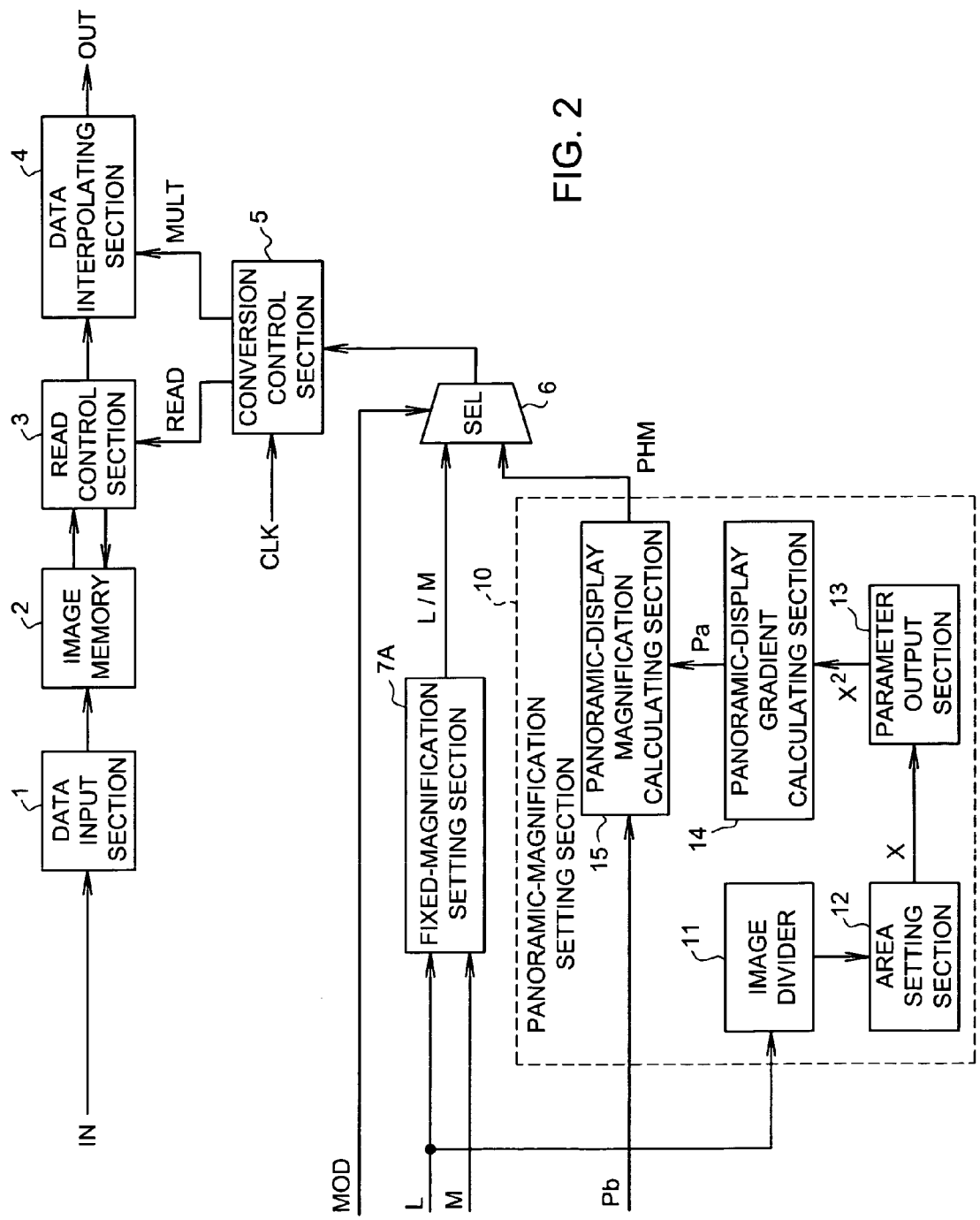
FIG. 2 is a configuration diagram of an image converter circuit illustrating an embodiment of the present invention.

FIG. 2 is a configuration diagram of an image converter circuit illustrating an embodiment according to the present invention. Like reference numerals designate corresponding similar elements through FIGS. 1 and 2.

The image converter circuit converts the number of pixels making up one screen to output enlarged-image data OUT, in order to display the input-image data IN representing M horizontal pixels×N vertical pixels on a display device having L horizontal pixels×N vertical pixels. This circuit includes a data-input section 1 to which the input-image data IN is provided. An image memory 2 is connected to the data-input section 1. The image memory 2 is configured by N line memories, each of which stores image data representing M pixels for each of N horizontal lines. The input image data IN inputted through the data input section 1 is sequentially written into the image memory 2.

The image memory 2 is connected to a read-control section 3. The read-control section 3 reads the designated one of image data from the image memory 2 according to the read-designating information READ that designates positions of pixels to be converted, and provides the read data to a data interpolating section 4. The data interpolating section 4 enlarges the image data provided from the read-control section 3 by interpolating pixels depending upon the magnification-designating information MULT, to output magnification image data OUT.

The image converter circuit has a conversion-control section 5 that sequentially generates read-designating information READ and magnification-designating information MULT in predetermined timing in accordance with a clock signal CLK, and supplies those to the read-control section 3 and the data interpolating section 4, respectively. The conversion-control section 5 is connected to a fixed-magnification setting section 7A and a panoramic-magnification setting section 10, through a selector 6 that switches a display mode in response to a mode signal MOD.

The fixed-magnification setting section 7A designates a magnification (i.e., L/M times along the horizontal direction) at which input-image data IN representing M horizontal pixels×N vertical pixels can be displayed, with uniform enlargement, on a display device having L horizontal pixels×N vertical pixels (where it is to be noted that the numbers of input vertical pixels and output vertical pixels may be different from each other. In this embodiment, the numbers of input vertical pixels and output vertical pixels are described as being the same for sake of simplicity). The fixed-magnification setting section 7A is configured to calculate a magnification, in accordance with a horizontal number M of pixels of the input-image data IN provided from an external source and a horizontal number L of pixels of an output device.

In order to generate a panoramic image, the panoramic-magnification setting section 10 vertically divides one screen into a plurality of areas and sets the number of pixels for each of the areas to calculate a magnification PHM for panoramic display on each of the area. The magnifications PHM for panoramic display are set to be low for the central area, to be high for the outer areas, and to be smoothly varying values for the intermediate areas in accordance with a monotonic increasing function such as a quadratic function).

The panoramic-magnification setting section 10 is configured by an image divider 11, an area setting section 12, a parameter output section 13, a panoramic-display gradient calculating section 14 and a panoramic-display magnification calculating section 15.

The image divider 11 vertically divides an enlarged image into areas in the number of $2^n$. In the image divider 11, the horizontal number L of output pixels designated externally, i.e., the horizontal number of pixels to be displayed on the display device, is divided by $2^n$. The quotient resulting from the division is provided as the horizontal number of pixels in the central area, and the remainder is allotted to both the end areas. Thus, the image division is performed such that the areas have their corresponding pixels that are nearly equal in the number, wherein a total number of the pixels assigned to the areas are the horizontal number L of the number of output pixels. Therefore, the enlarged image is divided into areas that have nearly the same number and arranged symmetrically.

The area setting section 12 sequentially provides the area numbers X assigned to the respective areas, in accordance with the number of pixels of the areas.

The parameter output section 13 provides $X^2$ as a parameter by using the area number X provided from the area setting section 12. The parameter $X^2$ can be prepared as a fixed parameter stored in a memory such as a ROM if previously determining the range of the number X of the areas to be obtained by the image division, thereby to eliminate an arithmetic circuit and to suppress large scale of the circuit.

A panoramic-display gradient calculating section 14 calculates a gradient Pa for panoramic display for the area number X, by using the following expression:

$$Pa=256/(-aX^2+b),$$

where the constant value "−a" is a negative gradient of a quadratic function (i.e., $-aX^2+b$). This provides magnifications on the display screen in a region from the left end toward the center, thus determining the gradient for panoramic display. The constant value "a" can be selected at a step of 1/64 within a range from 4/64 (=0.0625) to 11/64 (=0.171875), under external control.

The constant value "b" is an intercept on the quadratic function, which is an offset value of a display magnification. The constant "b" can be set under external control, and can be usually set to a value of 255.

The panoramic-display magnification calculating section 15, in accordance with the gradient Pa for panoramic display calculated by the panoramic-display gradient calculating section 14 and a horizontal-magnification Pb at a base reference point (central magnification), calculates a magnification PHM for panoramic display by using the following expression:

$$PHM=Pa\times Pb=\{256/(-aX^2+b)\}\times Pb.$$

In the panoramic-magnification setting section 10, the horizontal magnification Pb at the base reference point is determined in accordance with the procedure described below.

At first, setting is made for the quadratic-curve constant "a" and the constant "b" that is an offset value. After the magnification Pb for display at the base reference point (central magnification) is set to one times, the magnification Pb is then increased in incremental steps. The setting completes when output-image data OUT calculated has horizontal pixels in the number that is equal to the number of horizontal pixels of the display device.

Figure 3:
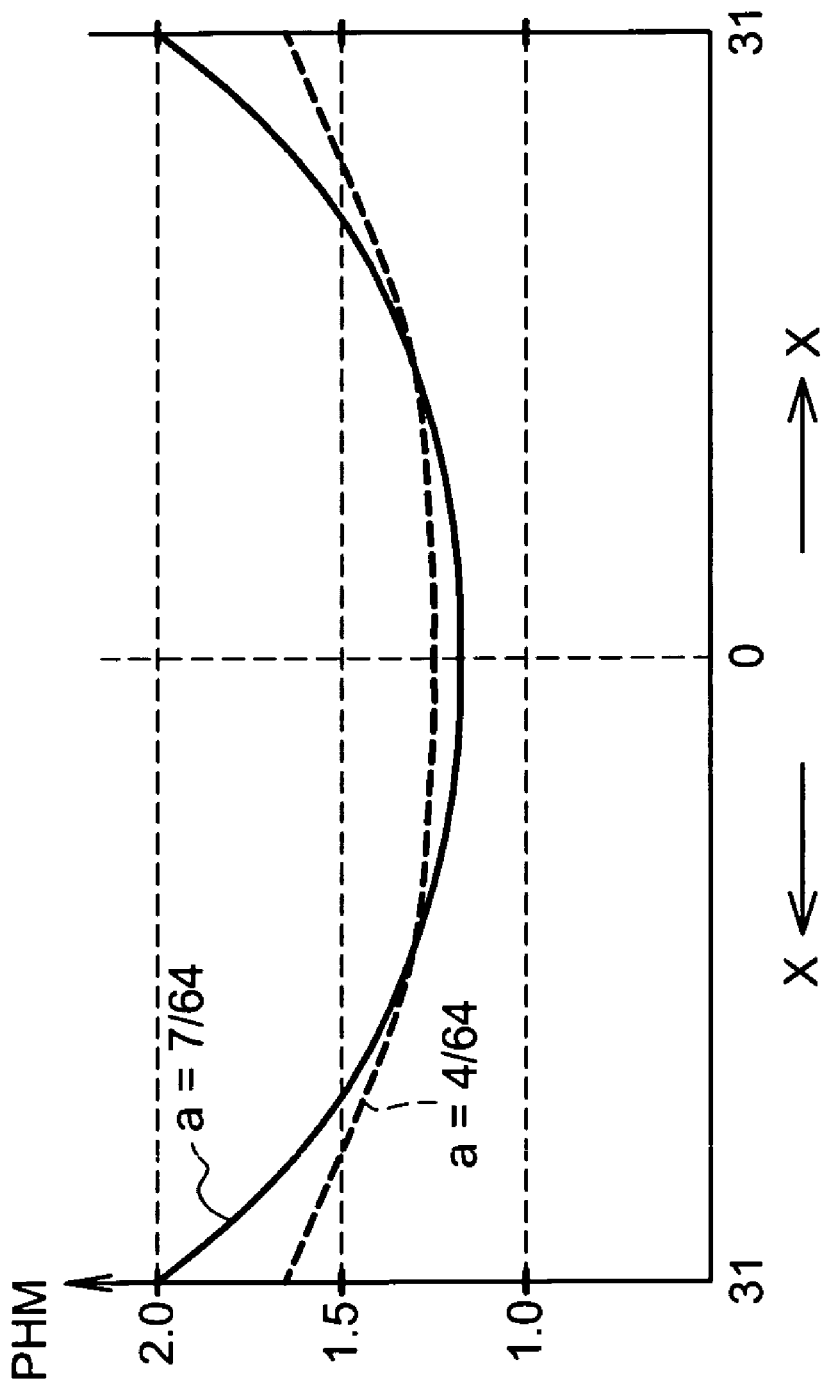
FIG. 3 is a figure showing an example of magnification PHM for panoramic display.

FIG. 3 illustrates an example of a magnification PHM for panoramic display to be set by the panoramic-magnification setting section 10. In the figure, the axis of abscissa designates an area number X using the center of the screen as a base point. The axis of ordinate designates a magnification PHM for panoramic display corresponding to the area number X. In the figure, a solid line represents a gradient for panoramic display that is set to a large value (a=7/64), and a broken line represents a gradient for panoramic display that is set to a small value (a=4/64).

Operations of the image converter circuit shown in FIG. 2 will now be described.

It is herein assumed that the input-image data IN has horizontal pixels in the number of 720 while output-image data OUT has horizontal pixels in the number of 960. Meanwhile, the magnification PHM for panoramic display as a setting coefficient value is set to a constant value of "a" that causes the gradient for panoramic display to be large. The constant "b" is set to 255, and the horizontal magnification Pb at a base reference point is set to 1.142.

Depending upon the horizontal number L of pixels externally established, the image divider 11 divides the image into nearly uniformly sized areas. In the case of taking the horizontal number L of pixels-to-output as 960 and the number of the image areas as 26=64, the quotient resulting from the division is provided as 15 with no remainder. Accordingly, the number of pixels for the each area can be 15 evenly by the image division. The areas obtained by the image division is provided with respective area numbers, to provide a variable X of the magnification PHM for panoramic display that is counted down as 31, 30, 29, . . . , 1 and 0 starting from the left of the screen, and is counted up as 0, 1, 2, . . . , 29, 30 and 31 starting from the center toward the right. The area number X is outputted from the area setting section 12. The area number X is provided to the parameter output section 13. The parameter $X^2$ previously written into the ROM of the parameter output section 13 is read out and provided to the panoramic-display gradient calculating section 14.

The panoramic-display gradient calculating section 14 calculates a gradient Pa for panoramic display for the each area, depending upon the parameter $X^2$ and the constants "a" and "b". The gradient Pa for panoramic display is provided to the panoramic-display magnification calculating section 15 that multiplies the gradient Pa by the horizontal magnification Pb at the base reference point to generate a magnification PHM for panoramic display.

The magnification PHM for panoramic display is provided to the converter control section 5 so that the conversion-control section 5 provides the magnification PHM for panoramic display to the data interpolating section 4. Furthermore, the converter control section 5 outputs read-designating information to the read control section 3 to read predetermined input-image data IN from the image memory 2. Accordingly, the read control section 3 reads the image data in the area to be enlarged from the image memory 2 and provides it to the data interpolating section 4.

In the data interpolating section 4, a linear interpolation for enlarging the area is performed on the image data provided from the read control section 3, thereby to generate the enlarged area having the number of pixels corresponding to the magnification provided by the magnification PHM for panoramic display. Then, the horizontally enlarged image data OUT depending upon the designated magnification is outputted for each of the areas. Therefore, the horizontally enlarged image data OUT depending upon the magnification PHM for panoramic display is provided. In this case, because the gradient for panoramic display is large, an enlarged image is displayed with enhanced magnification on both ends of the screen.

In the case of setting the gradient for panoramic display to be small, there can be provided a constant "a" of 4/64, a constant "b" of 255, and a horizontal magnification Pb at the base reference point of 1.224, for example. The enlargement interpolation in this case is similar to that in the case of setting the gradient for panoramic display to be large. When the gradient for panoramic display is small, the difference in magnification between the center and the end of the screen is small. Then, the wholly horizontally enlarged image is displayed.

When the input-image data IN has pixels in the horizontal number of 720 and the output image data OUT has pixels in the horizontal number of 1366, if the constant "a" is set to 7/64 to set the gradient for panoramic display to be large and the constant "b" (offset value) is set to 255, then the horizontal magnification Pb at the base reference point is obtained as 1.641.

In this case, because the number of horizontal pixels L is 1366 and the number of the image areas is 64, the quotient resulting from the division is obtained as 21 with the reminder of 22. The reminder of 22 is assigned to the areas such that 1 is assigned to the areas one by one from the left end toward the center of the screen, and from the right end toward the center of the screen. Therefore, the number of pixels is set to 22 for each of the areas represented by the area numbers X=31, 30, 21 starting from the outside of the screen, and the number of pixels is set to 21 for each of the areas represented by the area number X=20, 19, . . . , 0 in the central region of the screen.

In the fixed-magnification mode, where the number of input pixels is 720 and the number of pixels to be displayed is 960, the magnification is obtained as 960/720=4/3. Linear interpolation is performed on three input pixels for enlargement to generate four pixels to be displayed. By performing the linear interpolation uniformly along the horizontal direction, 720 input pixels can be enlarged into 960 pixels to be displayed.

On the other hand, in the panoramic display, the magnification PHM for panoramic display changes depending upon the area number X. It is assumed that the magnification PHM for panoramic display changes in units of 15 pixels for the number of the image areas taken as 64, where PHM=1.950 for area 31 and PHM=1.867 for the area 30, . . . . A linear interpolation for an enlargement of the area 31 is performed by using the input pixels at 15/1.950. A linear interpolation for an enlargement of the area 30 is performed by using the input pixels at 15/1.867. In this manner, the enlargement-interpolation is performed over the entire 64 areas by using 720 input pixels.

In view of the foregoing, the image converter circuit of the present embodiment provides several advantages as described below.

(1) The panoramic-magnification setting section 10 is provided to calculate the magnification PHM for panoramic display on the basis of the horizontal number L of output pixels externally established, the horizontal magnification Pb at the base reference point, and the constants "a" and "b". Accordingly, the image converter circuit can be applied to a display device having an arbitrary number of pixels without restriction.

(2) Because the number of the areas is set to $2^n$ for the panoramic display, there is no need for a division circuit to calculate the number of pixels for each area obtained by the image division, thus simplifying a circuit configuration.

(3) Because of calculating the magnification PHM for panoramic display for each area number X, panoramic display is available at the magnification PHM for panoramic display that can change smoothly, thus reducing image deterioration.

(4) Because the parameter calculating section 13 is configured with a memory such as a ROM that in advance stores values of $X^2$ with respect to the variable X, the circuit configuration can be simplified.

The present invention is not limited to the foregoing embodiment but can be modified in various ways. Such modifications include the following configuration.

The numbers of input vertical pixels and output vertical pixels have been described as being the same number. Alternatively, those numbers may be different from each other. In this case, no image division can be horizontally performed and the vertical magnification can be set to a fixed constant value (=the number of output pixels/the number of input pixels).

It is understood that the foregoing description and accompanying drawings set forth the preferred embodiments of the invention at the present time. Various modifications, additions and alternatives will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An image converter circuit comprising:
   an image memory for storing an input image;
   a read control section for reading image data from said image memory in accordance with read-designating information designating an area to be converted;
   a data interpolating section for interpolating pixels depending upon magnification-designating information to enlarge an image read out by said read-control section, and outputting the enlarged image; and
   a magnification setting section for setting the read-designating information and the corresponding magnification-designating information in accordance with both a number of pixels of the input image and a number of pixels of the enlarged image;

wherein said magnification setting section includes:

an image divider for vertically dividing the enlarged image into a plurality of areas such that a difference in a number of pixels between the areas is within a predetermined range; and a magnification calculating section for calculating horizontal magnifications for the respective areas to provide the read-designating information and the corresponding magnification-designating information, said each horizontal magnification having a value that, in accordance with a monotonic increasing function, increases with increasing distance from a center area of said plurality of areas; and b) wherein said monotonic increasing function includes an inverse of a quadratic function having a negative gradient.

2. An image converter circuit according to claim 1, wherein a number of the areas is set to a value of $2^n$.

3. An image converter circuit according to claim 1, wherein said predetermined range is set to a value of 1.

* * * * *